(12) United States Patent
Fournier

(10) Patent No.: US 7,058,926 B2
(45) Date of Patent: Jun. 6, 2006

(54) TOOL FOR IMPLEMENTING FLOATING-POINT RELATED APPLICATIONS USING CUSTOMIZED LANGUAGE

(75) Inventor: Laurent Fournier, Givat Elah (IL)

(73) Assignee: International Business Machines Corporation, Armonk, NY (US)

( * ) Notice: Subject to any disclaimer, the term of this patent is extended or adjusted under 35 U.S.C. 154(b) by 597 days.

(21) Appl. No.: 09/927,457

(22) Filed: Aug. 13, 2001

(65) Prior Publication Data

US 2003/0033591 A1    Feb. 13, 2003

(51) Int. Cl.
*G06F 9/44*    (2006.01)
(52) U.S. Cl. ...................... 717/117; 712/222
(58) Field of Classification Search ........ 717/124–148, 717/114–117; 714/124, 125; 712/222
See application file for complete search history.

(56) References Cited

U.S. PATENT DOCUMENTS

| | | | | |
|---|---|---|---|---|
| 5,450,555 A | * | 9/1995 | Brown et al. ............... | 712/228 |
| 5,572,664 A | * | 11/1996 | Bujanos ....................... | 714/25 |
| 6,256,776 B1 | * | 7/2001 | Melanson ................... | 717/124 |
| 6,647,513 B1 | * | 11/2003 | Hekmatpour ............... | 714/37 |

OTHER PUBLICATIONS

C. Kaner, Software negligence and testing coverage, In Proceedings of STAR 96: the Fifth International Conference, Software Testing, Analysis and Preview, pp. 299-327, (1996).
B. Beizer, software Testing Techniques. Van Nostrand Reinhold Cohn, 1990.
Grinwald et al., "User Defined Coverage—A Tool Supported Methodology for Design Verification", *Proceedings of the 35th Design Automation Conference (DAC)*, pp. 158-163, (1998).
Fournier et al., "Functional Verification Methodology of Microprocessors Using the Genesys Test-Program Generator", *Functional Verification Methodology*, pp. 1-7, (1998).
Lewin et al., "Constraint Satisfaction for Testing Program Generation", *Int. Phoenix Conference on Computers and Communications*, (1995). 4 pages.
Aharon et al., "Test Program Generation for Functional Verification of PowerPC Processors in IBM", *32 Design Automation Conferecnce, San Francisco*, pp. 279-285, (1995).
Lichtenstein et al., "Midel Based Test Generation for Processor Verification", *Innovative Applications for Artificial Intelligence (IAAI), AAAI*, (1994), 12 Pages.

(Continued)

*Primary Examiner*—Tuan Dam
*Assistant Examiner*—Chuck Kendall
(74) *Attorney, Agent, or Firm*—Browdy and Neimark, PLLC

(57) ABSTRACT

A tool for implementing a Floating-Point related application. The tool includes a receiver for receiving a list of commands in a computer language. The language defines Floating-Point events of interest and the regrouping of events into a coverage model in respect of a desired FP instruction. The coverage model has the form of a sequence of Floating-Point commands with constraints on the input operands, intermediate result operand and the result operand. The constraints are expressed in terms of sets that define allowable Floating-Point numbers. The tool further includes a parser for parsing the commands and a processor for processing the parsed commands for realizing on the basis of the events and the coverage model the Floating-Point related application.

35 Claims, 2 Drawing Sheets

OTHER PUBLICATIONS

Aagaard et al., "Formal Verification of Iterative Algorithms in Microprocessors", *Interl Corporation, Hillsboro, Oregon, USA, DAC*, (2000), pp. 200-206.

O'Leary et al., "Formally Verifying IEEE Compliance of Floating-Point Hardware", *Intel Technology Journal*, vol. 1999-Q1, pp. 1-14, (1999).

Clarke et al., "Verifying the SRT Division Algorithm Using Theorem Proving Techniques", *Formal Methods in System Design*, vol. 14, pp. 7-44, (1999).

Russinoff, "A mechanically Checked Proof of Correctness of the AMD K5 Floating Point Square Root Microcode", *Formal Methods in System Design*, vol. 14, pp. 75-125, (1999).

B. Marick, The Craft of Software Testing Subsystem Testing Including Object-based and Object oriented Testing. Prentice-Hall, (1995).

B. Beizer, "Software Testing Techniques", Second Edition, *International Thomson Computer Press*, (1990).

\* cited by examiner

TOOL FOR IMPLEMENTING FLOATING-POINT RELATED APPLICATIONS USING CUSTOMIZED LANGUAGE

LIST OF PRIOR ART

1. "Verifying the SRT Division Algorithm Using Theorem Proving Techniques", Edmund M. Clarke, Steven M. German and Xudong Zhao, 1999. Book: FORMAL METHODS IN SYSTEM DESIGN, volume 14, number 1, January, 1999, page 7.
2. "A Mechanically Checked Proof of Correctness of the AMD K5 Floating Point Square Root Microcode", David M. Russinoff. Book: FORMAL METHODS IN SYSTEM DESIGN, volume 14, number 1, January 1999, page 75.
3. J. O'Leary, X. Zhao, R. Gerth, and C.-J. H. Seger, "Formally verifying IEEE compliance of floating-point hardware", Intel Technology Journal, Vol. 1999-Q1, pp. 1–14, Available on the Web as http://developer.intel.com/technology/itj/q11999/art icles/art_5.htm, 1999.
4. Mark D. Aagaard, Robert B. Jones, Roope Kaivola, Katherine R. Kohastsu, Carl-Johan, J. Seger, "Formal Verification of Iterative Algorithms in Microprocessors", Interl Corporation, Hillsboro, Oreg., USA, DAC 2000.
5. Y. Lichtenstein, Y. Malka and A. Sharon, Model-Based Test Generation For Processor Design Verification, Innovative Applications of Artificial Intelligence (IAAI), AAAI Press, 1994.
6. A. Aharon, D. Goodman, M. Levinger, Y. Lichtenstein, Y. Malka, C. Metzger, M. Molcho, M. Molcho and G. Shurek, Test Program Generation for Functional Verification of PowerPC Processors in IBM, 32nd Design Automation Conference, San Francisco, June 1995, pp. 279–285.
7. L. Fernier, D. Lewis, M. Levinger, E. Roytman and Gil Shurek, Constraint Satisfaction for Test Program Generation, Int. Phoenix Conference on Computers and Communications, March 1995.
8. L. Fernier, Y. Arbetman, M. Levinger, Functional Verification Methodology for Microprocessors Using the Genesys Test Program Generator. Application to the x86Microprocessors Family. DATE99, Munchen, 1999.
9, R. Grinwald, E. Harel, M. Orgad, S. Ur, and A. Ziv. User defined coverage—a tool supported methodology for design verification, in the Proceedings of the 35th Design Automation Conference (DAC), pages 158–163, June 1998.
10. Beizer, Software Testing Techniques, Second Edition, International Thomson Computer Press, 1990.
11. B. Marick. The Craft of Software Testing, Subsystem Testing Including Object-Based and Object-Oriented Testing. Prentice-Hall, 1995.
12. C. Kaner. Software negligence and testing coverage, In proceedings of Conference, Software Testing, Analysis and Review, pages 299–327, June 1996.

FIELD AND BACKGROUND OF THE INVENTION

IEEE compliance to Floating-Point hardware in microprocessors has traditionally been a challenging task to achieve. Many escape bugs, including the infamous Pentium bug, belong to the floating-point unit and reveal that the verification process in this area is still far from being optimal. The ever-growing demand for performance and time-to-market causes the verification work to become increasingly harder. So does the low tolerance for bugs on the finished product. There are many sources of problems in the implementation of the Floating-Point unit, ranging from data problems on single instructions to the correct handling of sequences of instructions in which back-to-back events challenge superscalar implementations. The roots of the complexity stem, inter alia, both from the interpretation of the specification (architecture) and from the peculiarities of the implementation (microarchitecture). Verification has traditionally been targeted through the simulation of test-programs [5, 6]. Lately, the area of formal methods has significantly evolved, especially for the floating-point unit verification [1–4], but is still far from providing a complete answer to the problem.

Hence, in most environments, the simulation of test cases is still a major component of the verification process. Normally, for each event (test case) a customized procedure should be prepared. It is, therefore, readily appreciated that preparing numerous procedures for the many different calculation cases to test is a very labor-intensive task. In practice, then, simulation can be carried out on only a very small portion of the existing space. The rationale beyond verification by simulation is that one acquires confidence on design correctness by running a set of test cases exercising a sufficiently large number of different cases, which, in some sense, are assumed to be a representative sample of the full space. It is inferred that the correct handling of the tested cases is a testimony for the design correctness of all cases. The difficult question is how to define such a representative set of test cases. Since both the architecture specification and the microarchitecture implementation yield a myriad of special cases, relying on pure (uniform) random test cases would be largely inefficient.

How does one know that a certain set of tests is sufficient? This question is related to the notion of coverage, i.e., to the comprehensiveness of the set related to the verification target [9–12]. Usually, coverage models are defined and the set of tests should fulfill all the existing tasks. A coverage model is a set of related cases.

For example, a common coverage model is one which requires to enumerate on all major IEEE Floating-Point types simultaneously for all operands of all FP instructions. For a given instruction with three operands, say ADD, this potentially yields a thousand ($10^3$) of cases to cover, assuming 10 major FP types (+/−NaNs, +/−Infinity, +/−Zero, +/−Denormal, +/−Normal). This model can be further refined by adding more FP types, such as Minimum and Maximum denormals, etc. Obviously, not all cases are possible (e.g. the addition of 2 positive denormal numbers cannot reach infinity), so that the actual number of cases is, in fact, lower than the size of the Cartesian product.

A coverage model or a set of all coverage models is typically (but not necessarily) an attempt to partition the set of all the calculation cases in such a way that the probability distribution should be similar for all subsets. There is, thus, a need in the art to substantially reduce the drawbacks of hitherto known solutions for verifying Floating-Point standard compliance.

Still further, there is a need in the art to provide for an improved technique for verifying a compliance with Floating-Point standards by defining Floating-Point events of interest and, if desired, regrouping them into coverage models.

Still further, there is a need in the art to provide for a computer language or computer language specification which enables to define Floating-Point events of interest and, if desired, regrouping them into coverage models. Such a language can be used for various applications, e.g. evaluation of coverage of tests being run on a design.

SUMMARY OF THE INVENTION

The invention provides for an apparatus for implementing a Floating-Point related application, comprising:
- a tool that includes:
  - a receiver for receiving a list of commands in a computer language; the language defining Floating-Point events of interest in respect of at least one FP instruction;
  - a parser for parsing the commands;
  - a processor configured to process at least the parsed commands for realizing the floating-point related application on the basis of said events.

The invention further provides for an apparatus for implementing a Floating-Point related application, comprising:
- a tool that includes:
  - a receiver for receiving a list of commands in a computer language; the language defining Ploating-Point events of interest and regrouping of events into at least one coverage model, in respect of at least one FP instruction; the coverage model having the form of a sequence of Floating-Point commands with constraints on (i) at least one intermediate result operand of the FP instruction, and (ii) result operand of the FP instruction;
  - a parser for parsing the commands;
  - a processor for processing at least the parsed commands for realizing the Floating-point related application at least on the basis of said events and said at least one coverage model.

Still further, the invention provides for an apparatus for implementing a Floating-Point related application, comprising:
- a tool that includes:
  - a receiver for receiving a list of commands in a computer language; the language defining Floating-Point events of interest and regrouping of events into at least one coverage model, in respect of at least one FP instruction; the coverage model having the form of a sequence of Floating-Point commands with constraints on (i) at least one intermediate result operand of the FP instruction, and (ii) result operand of the FP instruction; each one of said constraints is expressed as at least one set each of which defining allowable Floating-Point numbers;
  - a parser for parsing the commands;
  - a processor for processing at least the parsed commands for realizing at least on the basis of said events and said at least one coverage model the Floating-Point related application.

Yet further, the invention provides for a method for implementing a Floating-Point related application that includes the steps of:
(i) receiving a list of commands in a computer language; the language defining Floating-Point events of interest in respect of at least one FP instruction;
(ii) parsing the commands; and
(iii) processing at least the parsed commands for realizing the floating-point related application on the basis of said events.

The invention provides for a method for implementing a Floating-Point related application that includes the steps of:
(i) receiving a list of commands in a computer language; the language defining Floating-Point events of interest and regrouping of events into at least one coverage model, in respect of at least one FP instruction; the coverage model having the form of a sequence of Floating-Point commands with constraints on (i) at least ore intermediate result operand of the FP instruction, and (ii) result operand of the FP instruction;
(ii) parsing the commands; and
(iii) processing at least the parsed commands for realizing the Floating-point related application at least on the basis of said events and said at least one coverage model.

Still further, the invention provides for a method for implementing a Floating-Point related application, that includes the step of:
(i) receiving a list of commands in a computer language; the language defining Floating-Point events of interest and regrouping of events into at least one coverage model, in respect of at least one FP instruction; the coverage model having the form of a sequence of Floating-Point commands with constraints on (i) at least one intermediate result operand of the FP instruction, and (ii) result operand of the FP instruction; each one of said constraints is expressed as at least one set each of which defining allowable Floating-Point numbers;
(ii) parsing the commands; and
(iii) processing at least the parsed commands for realizing at least on the basis of said events and said at least one coverage model the Floating-point related application.

The invention further provides for a program storage device readable by machine, tangibly embodying a program of instructions executable by the machine to perform method steps for implementing a Floating-Point related application that includes the steps of:
i) receiving a list of commands in a computer language; the language defining Floating-Point events of interest in respect of at least one FP instruction;
ii) parsing the commands; and
iii) processing at least the parsed commands for realizing the floating-point related application on the basis of said events.

Still, further, the invention provides for a computer program product comprising a computer useable medium having computer readable program code embodied therein for causing the computer to implement a Floating-Point related application, comprising:
- computer readable program code for causing the computer to receive a list of commands in a computer language; the language defining Floating-Point events of interest in respect of at least one FP instruction;
- computer readable program code for causing the computer to parse the commands; and
- computer readable program code for causing the computer to process at least the parsed commands for realizing the floating-point related application on the basis of said events.

Yet further, the invention provides for a program storage device readable by machine, tangibly embodying a program of instructions executable by the machine to perform method steps for implementing a Floating-Point related application, that includes the steps of:
(i) receiving a list of commands in a computer language; the language defining Floating-Point events of interest and regrouping of events into at least one coverage model, in respect of at least one FP instruction; the coverage model having the form of a sequence of Floating-Point commands with constraints on (i) at least one intermediate result operand of the FP instruction, and (ii) result operand of the FP instruction; each one of said constraints is expressed as at least one set each of which defining allowable Floating-Point numbers;

(ii) parsing the commands; and (iii) processing at least the parsed commands for realizing at least on the basis of said events and said at least one coverage model the Floating-point related application.

Still further, the invention provides for a computer program product comprising a computer useable medium having computer readable program code embodied therein for causing the computer to implement a Floating-Point related application, comprising:

computer readable program code for causing the computer to receive a list of commands in a computer language; the language defining Floating-Point events interest and regrouping of events into at least one coverage model, in respect of at least one FP instruction; the coverage model having the form of a sequence of Floating-Point commands with constraints on (i) at least one intermediate result operand of the FP instruction, and (ii) result operand of the FP instruction; each one of said constraints is expressed as at least one set each of which defining allowable Floating-Point numbers;

computer readable program code for causing the computer to parse the commands; and computer readable program code for causing the computer to process at least the parsed commands for realizing at least on the basis of said events and said at least one coverage model the Floating-point related application.

The invention, provides for a program storage device readable by machine, tangibly embodying a program of instructions executable by the machine to perform method steps for implementing a Floating-Point related application, that includes the steps of:

(i) receiving a list of commands in a computer language; the language defining Floating-Point events of interest and regrouping of events into at least one coverage model, in respect of at least one FP instruction; the coverage model having the form of a sequence of Floating-Point commands with constraints on (i) at least one intermediate result operand of the FP instruction, and (ii) result operand of the FP instruction; each one of said constraints is expressed as at least one set each of which defining allowable Floating-Point numbers;

(ii) parsing the commands; and (iii) processing at least the parsed commands for realizing at least on the basis of said events and said at least one coverage model the Floating-point related application.

Yet further, the invention provides for a computer program product comprising a computer useable medium having computer readable program code embodied therein for causing the computer to implement a Floating-Point related application, comprising:

computer readable program code for causing the computer to receive a list of commands in a computer language; the language defining Floating-Point events of interest and regrouping of events into at least one coverage model, in respect of at least one FP instruction; the coverage model having the form of a sequence of Floating-Point commands with constraints on (i) at least one intermediate result operand of the FP instruction, and (ii) result operand of the FP instruction; each one of said constraints is expressed as at least one set each of which defining allowable Floating-Point numbers;

computer readable program code for causing the computer to parse the commands; and computer readable program code for causing the computer to process at least the parsed commands for realizing at least on the basis of said events and said at least one coverage model the Floating-Point related application.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
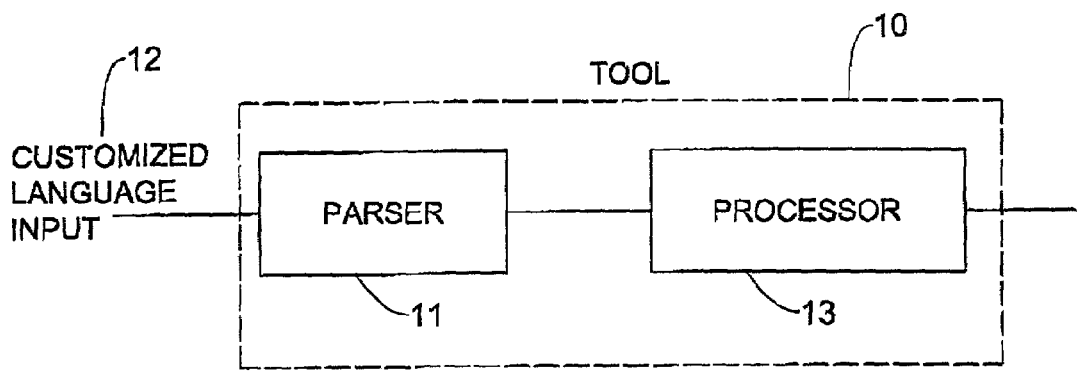
FIG. 1 is a generalized schematic illustration of a tool for implementing Floating-Point (FP) related applications in accordance with one embodiment of the invention.

Attention is first directed to FIG. 1, illustrating a generalized schematic illustration of a tool, (10), for implementing Floating-Point (FP) related applications, in accordance with one embodiment of the invention. The tool includes a parser module (11) configured to receive commands in a customized language (12) generate parsed commands and feed the so-parsed commands to a processor (13) that processes the commands for realizing a pre-defined (FP) related application. The invention is not bound by the specified tool configuration. The tool or portions thereof are realized in software, hardware, customized chip, or a combination thereof, all as required and appropriate.

Figure 2:
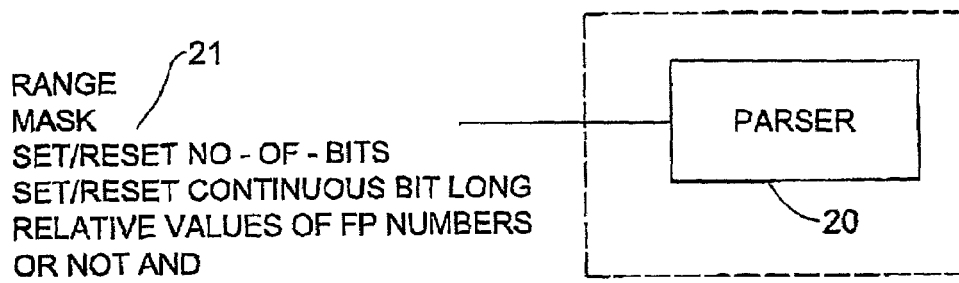
FIG. 2 is a generalized schematic illustration of an FP parser and an exemplary description of a customized language in accordance with one embodiment of the invention.

Turning now to FIG. 2, there is shown a generalized schematic illustration of an FP parser (20) and an exemplary description of a, customized language utilizing the following commands: Range, Mask, Set/Reset No-of-Bits, Set/Reset Continuous-Bit-Long; Relative Values of FP numbers and Set operations (OR, NOT, AND) (21), in accordance with one embodiment of the invention. The specific syntax is not given, seeing that the actual realization is generally known per se.

By one aspect of the invention, the language captures and defining an interesting Floating-Point event or events, and one (or more) groups of the events that constitute a coverage model(s).

By one embodiment, a coverage model is defined by specifying a set of different constraints to be fulfilled, each constraint corresponding to a particular task targeted by the coverage model. More precisely, a coverage model has the form of a sequence of FP commands, with sets of constraints on at least one of the following: (i) at east one intermediate result operand and (ii) result operand. If desired, the constraints may be imposed also on one or more of the input operands. The general outlook of a single instruction constraint may be in the following form:

Fpinst(Op1 in Pattern1)(Op2 in Pattern2)(IntRes in Pattern3)(Res in Pattern4)    (Eq.1), where Fpinst is a generic Floating-Point instruction with two input operands (Op1 and Op2), one intermediate result (IntRes) operand, and a result (Res) operand. The case of two input operands and a single intermediate result operand is used here for simplicity of notation, but of course, generalization to any number of such parameters is also applicable. By one embodiment, each one of said constraints is expressed as a set of allowable Floating-Point numbers. For convenience of description, consider a Pattern as a construct representing a logical OR among sets of FP numbers. The sets serve as constraints defining (in fact limiting) the allowable FP numbers for each term of (Eq. 1). Patterns have the general following form:

Pattern=Set1 OR Set2 OR . . . OR SetN    (Eq. 2), where each Set is a set of FP numbers. Each task of the coverage model corresponds to a specific selection of Set for each Pattern. Hence, covering the task is reduced to selecting a data vector where each individual data belongs to the corresponding selected Set. Thus, the number of different tasks engendered by such a single instruction is the multiplication of the number of Sets for each participating Pattern. The number of tasks for a sequence is obtained by multiplying the number of tasks of each individual instruction. It should be noted that the terms tasks and patterns are used interchangeably.

Whereas in the latter example the input operands, intermediate result operand and the result operand are all subject to pattern constraints, the invention is by no means bound by this example. Thus, by a modified embodiment, the intermediate result operand is subject to a pattern constraint and/or the result operand is subject to a pattern constraint. If desired, one or more of the input operands may also be subject to pattern constraint. The utilization of the pattern constraints will be exemplified below with reference to FIG. 3.

It should be noted that not necessarily all the FP number parts are limited (e.g. Mantissa and Exponent, constituting, each, a part of the FP number). Thus, if desired, only selected constituent(s) is (are) subject to the limitation, e.g. only the Mantissa or only the Exponent.

In accordance with one embodiment, the input is described in a language with set based constraints that facilitate the definition of different sets of FP numbers. This serves to conveniently define desired constraints posed by, say a verification plan's tasks. There follows now a description of a few possible commands in a set based language which facilitate the definitions of the specified constraints.

Ranges and masks: separate range constraints are possible on the Exponent and Mantissa. A mask is represented by an FP number where some bits are X (Don't care) while the others are regular 0's and 1's.

Set/Reset No-of-Bits: the ability to specify the number of bits equal to 1 (or 0) within any given field of the FP number. Exact, MIN and MAX are given (for example: at least 1 bit set in bits 61–63).

Set/Reset Continuous-Bit-Long: Ability to specify length of continuous stream of 1's or 0's. As before, Exact, MIN and MAX are given for any field without overlapping between fields, and without crossing the Mantissa-Exponent border. For example, a number with a continuous stream of at least 45 1's in its mantissa.

Relative Values of FP numbers: Specifying a Set for which the selected value should be a function of the value selected for another operand (usage of symbol). By one embodiment, + and − are sufficient, but by modified embodiment, the language can support additional operators. These operations have to be understood as the distance in terms of representable numbers. The symbols must be enabled on any field of the number. (Example: exponent at a distance of at most 2 from the exponent selected for the previous operand).

Sets operations (Intersection, union, complement, of same and different Set types).

The specified commands can be applied to one or more of the FP operands, i.e. anyone of the input operands, intermediate result operand(s), and final result operand.

It should be noted that the Set-Based language embodiment is by no means bound by this particular list of commands. Accordingly, one or more of the specified commands may be modified and/or deleted. Others may be added, all as required and appropriate, depending upon the particular application.

In general, any architecture resource which may influence FP instruction's results should also be defined. For example, for IEEE standard architecture, this bounds to Rounding Modes (e.g. +infinity; −infinity; 0 or nearest) and Enabled Flags, and they will therefore be part of the language. Thus, for example, coverage models defined by sequences of single instruction constraints (Eq. 1) are complemented by the definition of the specified attributes. The attributes are enabled, disabled or Don't care. Using 0, 1 and Don't care states with the ability to OR between these settings facilitates definition of coverage model(s) that encompass on several or all the values of such attributes. The use of the supplemental attributes (e.g. rounding models and enabled flags) will also be exemplified with reference to FIG. 3 below.

The set based language embodiment is useful for various applications including, but not limited to, FP verification plans. It enables to capture a wide scope of Floating-Point events. Even unexpected corner cases, often stemming from complex micro architecture implementation, are expressible through a set based language.

For a better understanding, there follows now a short description that exemplifies the usage of the specified commands in few typical, yet not exclusive, scenarios of verification plan application.

Range & Masks: certain values are critical, and it is important to be able to target both the neighborhood of these values (range) and numbers at a distance of a few bits (Masks). Moreover, to check correct rounding, only some bits of the intermediate results are relevant, while others can be random (Don't care).

Set/Reset Continuous-Bit-Long: It is often the case that numbers exhibiting extraordinary sequences of 1's and 0's are being handled in a specific way (to gain performance) in the micro architecture. For example, a number with a very long sequence of 1's (as in the Pentium bugs and in several PowerPC 630 bugs).

Relative Values of FP numbers: These relate between exponents of operands, say input operands. Consider for example, FADD between two input FP operands.

When exponents are too far apart (which accounts for the vast majority of cases), the addition is reduced to a trivial calculation, (i.e. the result more or less equals to the larger input operand). Thus, for example FADD ($2^{512}$, $2^{400}$) after rounding equals about $2^{512}$, i.e. the value of the larger operand. It is therefore desired to pose constraints on the exponent values of the input operands to be near (rather than far apart), so as to give rise to a result operand that is different than any of the input operands. This would better test the FADD instruction. This constraint can be easily realized by utilizing the Relative Values of FP numbers command. By another example, the Relative Values of FP numbers command can also be used to relate between an input operand and the result operand.

The utilization of Set-based language commands for verification plan purposes is, of course, not bound by the specified example. It would be noted, generally, that the set based language provides a powerful mechanism to pinpoint the targeted areas.

Another non-limiting example of utilizing the set-base language for verification plan application is by imposing constraint on the input and result operands (including intermediate result) using, say, the range command. This allows to define an event such as an overflow (intermediate result constraint) with one of the operands being a denormal number (input operand constraint).

Figure 3:
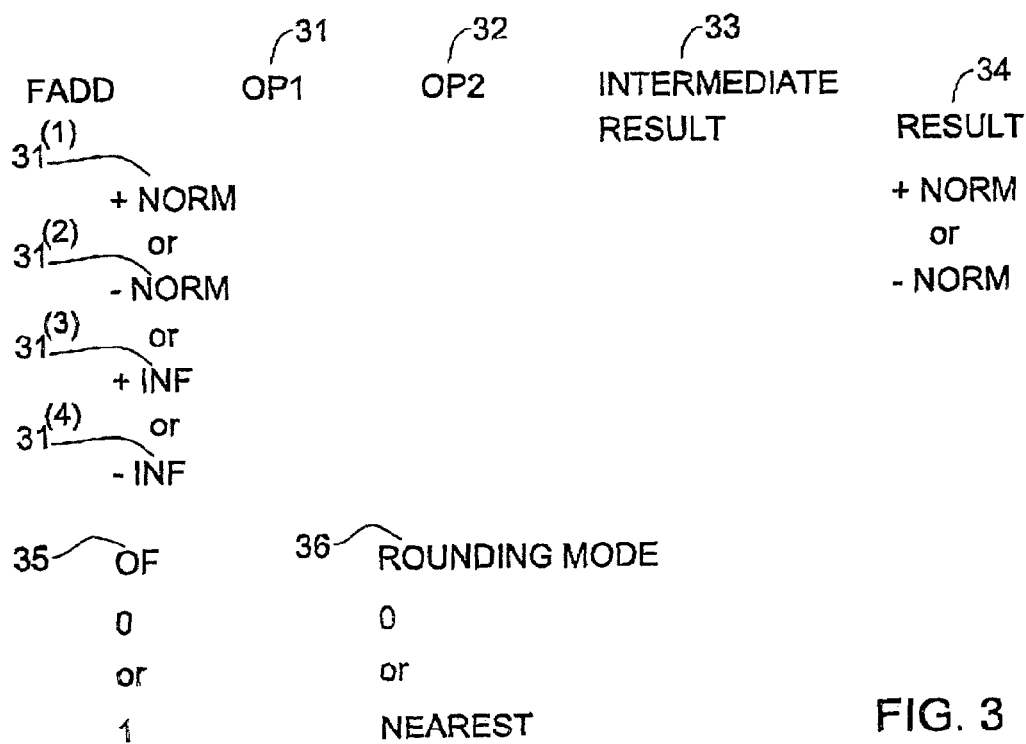
FIG. 3 illustrates a specific example of a coverage model.

By an alternative non-limiting embodiment, the tool that utilizes the language can be utilized for realizing coverage models, e.g. by regrouping events. Consider, for example, the set-based language that utilizes the specified command list. FIG. 3 illustrates an FADD instruction having OP1 and OP2 input operands, intermediate result operand, and an output operand (31 to 34, respectively). The constraints on the FP instruction comply with the notation of equation 1 above. The constraints for, say, the input operand OP1 (31) and result operand (34) limit the number of allowable FP numbers for each operand and can be represented, for convenience, in a form of a pattern (see Eq. 2). Thus, for OP1 (31), the allowable FP numbers being a logical OR among the following four sets: +Norm, −Norm, +Inf and −Inf ($31^1$ to $31^4$ respectively), where each set is implemented using the specified range command. In a similar manner, the allowable FP numbers for the result operand (34) is limited by a logical OR among the two sets +Norm, −Norm. The second input operand (32) and the intermediate result operand (33) are not subject, by this example, to any constraint. Whereas the latter example is confined to only the +− Norm and +− Inf sets, the invention is, of course, not bound by this specific example and accordingly other sets of FP numbers (such as +−Denorm, +−Zero, +−Nans; +−Max/Min Norm/ Denorm, in accordance with the IEEE standard) may be used all as required and appropriate. Each task of a coverage model corresponds to a selection of a specific set for each pattern (for those operands that are subject to pattern constrains, e.g. OP1 and result operands in FIG. 3). The FP numbers that are generated fall in the so selected sets. Thus, for a given task the +Norm set is selected for OP1 and −Norm set is selected for the result operand. The generated FP number for OP1 falls in the range of +Norm and the generated FP number for the result operand falls in the range of −Norm. There is no limit (i.e. set constraint) for the FP numbers of OP2 and the intermediate result as long as they meet the provision of the FADD instruction.

The coverage model for the FP instruction (say the specified FADD) encompasses all the possible tasks, such that for each task a different set combination is selected. (in the example of FIG. 3, there are 8 different tasks, i.e. multiplying four sets of the OP1 pattern by two sets of the result operand pattern.

As specified above, it is required to take into account the architecture resources which may influence the result of the FP instruction, such as the rounding mode (e.g. +infinity, −infinity 0, or nearest), flag register (e.g. overflow state, underflow state) and possibly others. By one embodiment, selected attributes are assigned, each, with "1" (enable), 0 (disable) or Don't care with the ability to OR between these settings in a similar manner as OR between sets in the specified pattern representation, thereby providing a comprehensive coverage model which not only embraces the selection of desired FP numbers, but also takes into account selected values of the attributes which represent the machine state. In the example of FIG. 3, the FADD instruction is tested (with FP numbers that are selected as explained in detail above) for both enable and disable states of the overflow flag OF (35) and for both 0 and nearest rounding modes (36).

Figure 4:
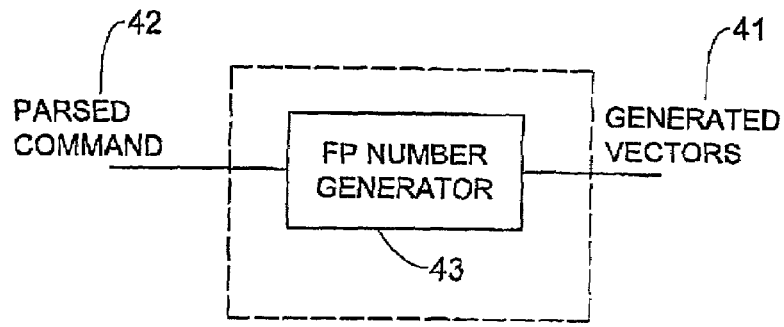
FIG. 4 is a generalized schematic illustration of the tool of FIG. 1 serving for generation of verification FP vectors, in accordance with one embodiment of the invention.

There follows now a specific example with reference to FIG. 4, in which the tool is used in an application for generating test vectors (41) for Floating-Point verification of microprocessors. The test vectors are generated according to a desired type of Floating-Point event (s) or/and coverage model(s) as defined by the input commands of the set-based language (42). To this end, the FP number generator (43) generates test vectors (41) satisfying the input constraints (42).

Figure 5:
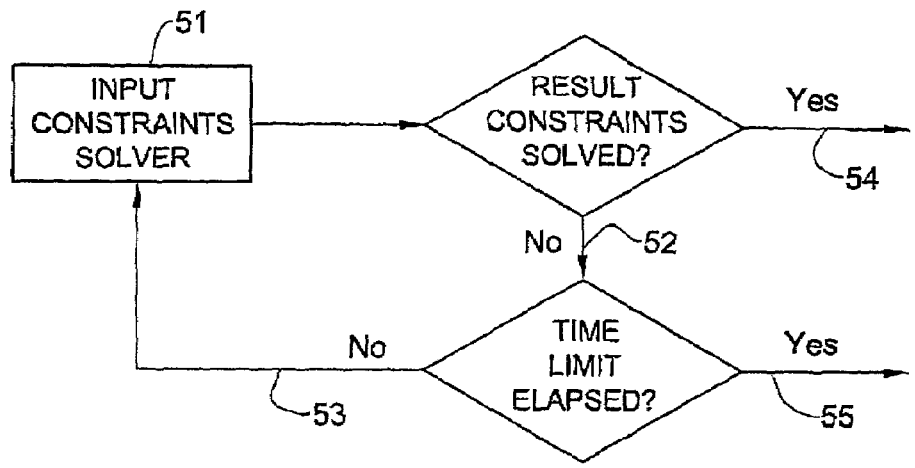
FIG. 5 is a schematic illustration of the generator of FIG. 4, in accordance with one embodiment of the invention.

Turning now to FIG. 5, there is shown one possible realization of the generator (43). As may be recalled, in accordance with an embodiment of the invention, the language enables constraints on the input, intermediate result and result operands, and even enables to define these constraints simultaneously. The test generator (43) in accordance with FIG. 5, operates as follows: it solves only the input operand constraints (51), and in case the solution does not match (52) the other (i.e. result and/or intermediate result operands) constraints, it tries again (53) until it either succeeds (54) or a time limit elapses (55). Solving the input is implemented by choosing a single element from a set. Solving the input constraints does not include being knowledgeable of the command semantics, and that is where the complexity starts in order to alleviate this complexity, a reiterating probabilistic-attempt technique is used. The invention is, of course, not bound by this specific generator, and by an alternative embodiment, another generator may be used, e.g. a generator that solves also the result/intermediate result constraints.

Figure 6:
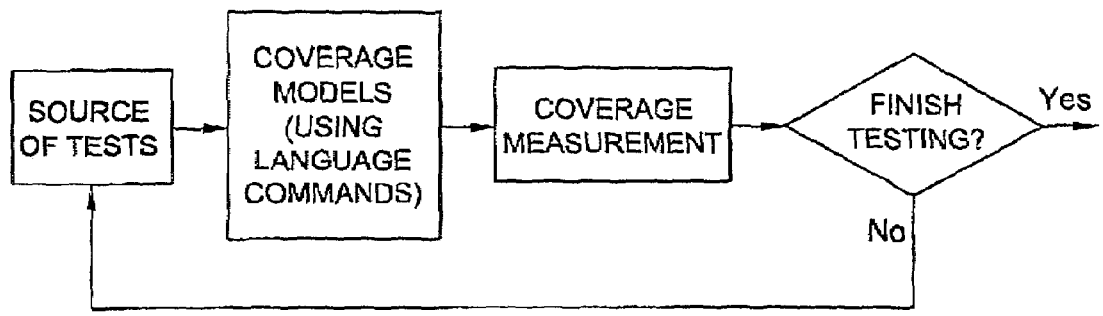
FIG. 6 is a generalized schematic illustration of the tool of FIG. 1 serving for evaluation of coverage of tests being run on a design, in, accordance with one embodiment of the invention.

Another non-limiting application of the tool of the invention is illustrated in FIG. 6. This application concerns evaluating the coverage of tests being run on a design. The source of the tests is of no importance. Commonly, there are available suites of tests coming from multiple sources (test generators, manually written tests, tests coming from previous similar designs, commercial suite of tests, etc.). Now, a very important question is raised, i.e. how does one know that a certain test is done? This is an issue related to coverage, which is a measurement of what has actually been tested related to the target. Since, in accordance with the invention, the test-plan can be formally written via a language of the kind specified, it can serve as the coverage reference for an appropriate coverage tool.

In accordance with another example, the tool and the associated language as described above can serve as the means to write the Floating-Point oriented Verification Plan.

Typically, the verification process of a microprocessor starts with the establishment of a Verification Plan (VP). This document includes a comprehensive description of all the verification goals. The VP should be composed from a deep understanding of the architecture, and from the known peculiarities of the micro architecture implementation. Available verification means (e.g., existing tests, test generators, etc.), should not be taken into account, as they might interfere with the desired scope of the document. As the design evolves and while the micro architecture is being refined and modified, the VP should be updated to reflect additional microarchitecture knowledge. A VP should also be incremented to reflect new insight brought by bug discovery, especially when the bug was found by chance and the VP did not previously cover the event leading to the bug.

Therefore, the VP is a dynamic document reflecting the present state of the design and the verification knowledge acquired.

In short, a Floating-Point VP is composed of a set of Floating-Point events, whose verification is assumed to provide a high-level of confidence on the design correctness.

The language commonly used to define these events is plain English. Beyond the standard problems of ambiguity due to the fact that English is not a formal language, the coverage models typically requested are complex and lengthy to write up. Less tangibly, but not of less importance, is the fact that not having a dedicated language practically limits the scope and comprehensiveness of the targeted set of events.

The language of the invention provides a powerful tool for composing VP, oriented towards the data-path of the Floating-Point Unit. It provides the natural constructs to capture FP complexity, define related events and coverage models, and thus enable to define the VP in a concise, and yet comprehensive manner.

In the method claims that follow, alphabetic characters used to designate claim steps are provided for convenience only and do not imply any particular order of performing the steps.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The present invention has been described with a certain degree of particularity, but various alterations and modifications can be carried out without departing from the scope of the following claims:

The invention claimed is:

1. An apparatus for implementing a Floating-Point related application, comprising:
   a tool that includes:
   a receiver for receiving a list of floating-point commands in a formal computer language; the language having set based constraints that facilitate defining Floating-Point events of interest in respect to at least one floating-point instruction;
   a parser for parsing the floating-point commands;
   a processor configured to process at least the parsed commands for realizing the Floating-Point related application on the basis of said events.

2. The apparatus of claim 1, wherein said language further defining regrouping of the events into at least one coverage model; and wherein said processor is configured to process the parsed commands for realizing the floating-point related application on the basis of said events and said at least one coverage model.

3. The apparatus according to claim 1, wherein said application is an evaluation of coverage of tests being run on a design.

4. The apparatus according to claim 1, wherein said processor is configured to generate a sequence of test vectors for verification of Floating-Point module operation; the test vectors meet the constraints of said events.

5. The apparatus according to claim 4, wherein said verification includes verifying if the Floating-Point operation complies with IEEE standard for Floating-Point.

6. For use with the Floating-Point module of claim 1, a computer language; the language defining Floating-Point events of interest in respect to at least one floating-point instruction.

7. The apparatus according to claim 6, wherein said list of commands includes: Range of floating-point numbers; Mask on bits of floating-point number; Set or Reset Number of Bits in a floating-point number; Set or Reset Continuous-Bit-Long in a floating-point number; Relative Values of at least two floating-point numbers, and logical operations among said commands.

8. The computer language of claim 6, further defining regrouping of the events into at least one coverage model.

9. The apparatus according to claim 8, wherein said list of commands includes: Range of floating-point numbers; Mask on bits of a floating-point number; Set or Reset Number of Bits in a floating-point number; Set or Reset Continuous-Bit-Long in a floating-point number; Relative Values of at least two floating-point numbers, and logical operations among said commands.

10. The apparatus according to claim 1, wherein said list of commands includes: Range of floating-point numbers ; Mask on bits of floating-point number; Set or Reset Number of Bits in a floating-point number; Set or Reset Continuous-Bit-Long in a floating-point number; Relative Values of at least two floating-point numbers, and logical operations among said commands.

11. An apparatus for implementing a Floating-Point related application, comprising:
   a tool that includes:
   a receiver for receiving a list of floating point commands in a formal computer language; the language having set based constraints that facilitate defining Floating-Point events of interest and regrouping of events into at least one coverage model, in respect to at least one floating-point instruction; the coverage model having the form of a sequence of Floating-Point commands with constraints on (i) at least one intermediate result operand of the floating-point instruction, and (ii) result operand of the floating-point instruction;
   a parser for parsing the floating point commands;
   a processor for processing at least the parsed commands for realizing the Floating-Point related application at least on the basis of said events and said at least one coverage model.

12. The apparatus according to claim 11, wherein said application is an evaluation of coverage of tests being run on a design.

13. The apparatus according to claim 11, wherein said processor is configured to generate a sequence of test vectors for verification of Floating-Point module operation; the test vectors meet the constraints of said events and the at least one coverage model.

14. The apparatus according to claim 11, wherein said verification includes verifying if the Floating-Point operation complies with the IEEE standard for Floating-Point.

15. For use with the Floating-Point module of claim 11, a formal computer language; the
language having set based constraints that facilitate defining Floating-Point events of interest and regrouping of events into at least one coverage model, in respect to at least one floating-point instruction, the coverage model having the form of a sequence of Floating-Point commands with constraints on (i) at least one intermediate result operand of the floating-point instruction, and (ii) result operand of the floating-point instruction.

16. The apparatus according to claim 15, wherein said list of commands includes: Range of floating-point numbers ; Mask on bits of a floating-point number; Set or Reset Number of Bits in a floating point
number; Set or Reset Continuous-Bit-Long in a floating-point number; Relative Values of at least two floating-point numbers, and logical operations among said commands.

17. The apparatus according to claim 11, wherein said list of commands includes: Range of
floating-point numbers ; Mask on bits of a floating-point number; Set or Reset Number of Bits in a floating-point number; Set or Reset Continuous-Bit-Long in a floating-point number; Relative Values of at least two floating-point numbers, and logical operations among said commands.

18. The apparatus according to claim 11, wherein said constraints are further applied to attributes of Machine State.

19. An apparatus for implementing a Floating-Point related application, comprising:
a tool that includes:
a receiver for receiving a list of floating point commands in a formal computer language; the language having set based constraints that facilitate defining Floating-Point events of interest and regrouping of events into at least one coverage model, in respect to at least one floating-point instruction; the coverage model having the form of a sequence of Floating-Point commands with constraints on (i) at least one intermediate result operand of the floating-point instruction, and (ii) result operand of the floating-point instruction; each one of said constraints is expressed as at least one set each of which defining allowable Floating-Point numbers;
a parser for parsing the floating point commands;
a processor for processing at least the parsed commands for realizing at least on the basis of said events and said at least one coverage model the Floating-Point related application.

20. The apparatus according to claim 19, wherein said application is an evaluation of coverage of tests being run on a design.

21. The apparatus according to claim 19, wherein said processor is configured to generate a sequence of test vectors for verification of Floating-Point module operation; the test vectors meet the constraints of said events and at least one coverage model.

22. The apparatus according to claim 19, wherein said verification includes verifying if the Floating-Point operation complies with the IEEE standard for Floating-Point.

23. For use with the Floating-Point module of claim 19, a formal computer language; the language having set based constraints that facilitate defining Floating-Point events of interest and regrouping of events into one coverage model, in respect to at least one floating-point instruction; the coverage model having the form of a sequence of Floating-Point commands with constraints on: (i) at least one intermediate result operand of the floating-point instruction, and (ii) result operand of the floating-point instruction; each one of said constraints is expressed as at least one set each of which defining allowable Floating-Point numbers.

24. The apparatus according to claim 23, wherein said list of commands includes: Range of floating-point numbers ; Mask on bits of a floating-point number; Set or Reset Number of Bits in a floating-point number; Set or Reset Continuous-Bit-Long in a floating-point number; Relative Values of at least two floating-point numbers, and logical operations among said commands.

25. The apparatus according to claim 19, wherein said list of commands includes: Range of floating-point numbers ; Mask on bits of a floating-point number; Set or Reset Number of Bits in a floating-point number; Set or Reset Continuous-Bit-Long in a floating-point number; Relative Values of at least two floating-point numbers, and logical operations among said commands.

26. The apparatus according to claim 19, wherein said constraints are further applied to attributes of Machine State.

27. A method f or implementing a Floating-Point related application that includes the steps of:
(a) receiving a list of floating point commands in a formal computer language; the language having set based constraints that facilitate defining Floating-Point events of interest in respect to at least one floating-point instruction;
(b) parsing the floating point commands; and
(c) processing at least the parsed commands for realizing the Floating-Point related application on the basis of said events.

28. A method for implementing a Floating-Point related application in a computer system that includes the steps of:
(a) receiving a list of floating point commands in a formal computer language; the language having set based constraints that facilitate defining Floating-Point events of interest and regrouping of events into at least one coverage model, in respect to at least one floating-point instruction; the coverage model having the form of a sequence of Floating-Point commands with constraints on (i) at least one intermediate result operand of the floating-point instruction, and (ii) result operand of the floating-point instruction;
(b) parsing the floating point commands; and
(c) processing at least the parsed commands for realizing the Floating-Point related application at least on the basis of said events and said at least one coverage model.

29. A method for implementing a Floating-Point related application in a computer system, that includes the step of:
(a) receiving a list of floating point commands in a formal computer language; the language having set based
constraints that facilitate defining Floating-Point events of interest and regrouping of events into at least one coverage model, in respect to at least one floating-point instruction; the coverage model having the form of a sequence of Floating-Point commands with constraints on (i) at least one intermediate result operand of the floating-point instruction, and (ii) result operand of the floating-point instruction; each one of said constraints is expressed as at least one set each of which defining allowable Floating-Point numbers;

(b) parsing the floating point commands; and
(c) processing at least, the parsed commands for realizing at least on the basis of said events and said at least one coverage model the Floating-Point related application.

30. A program storage device readable by machine, tangibly embodying a program of instructions executable by the machine to perform method steps for implementing a Floating-Point related application that includes the steps of
   (a) receiving a list of floating point commands in a formal computer language; the language having set based constraints that facilitate defining Floating-Point events of interest in respect to at least one floating-point instruction;
   (b) parsing the floating point commands; and
   (c) processing at least the parsed commands for realizing the floating-point related application on the basis of said events.

31. A computer program product comprising a computer useable medium having computer readable program code embodied therein for causing the computer to implement a Floating-Point related application, comprising:
   computer readable program code for causing the computer to receive a list of floating point commands in a formal computer language; the language having set based constraints that facilitate defining Floating-Point events of interest in respect to at least one floating-point instruction;
   computer readable program code for causing the computer to parse the floating point commands; and
   computer readable program code for causing the computer to process at least the parsed commands for realizing the Floating-Point related application on the basis of said events.

32. A program storage device readable by machine, tangibly embodying a program of instructions executable by the machine to perform method steps for implementing a Floating-Point related application, that includes the steps of:
   (a) receiving a list of floating point commands in a formal computer language; the language having set based constraints that facilitate defining Floating-Point events of interest and regrouping of events into at least one coverage model, in respect to at least one floating-point instruction; the coverage model having the form of a sequence of Floating-Point commands with constraints on (i) at least one intermediate result operand of the floating-point instruction, and (ii) result operand of the floating-point instruction; each one of said constraints is expressed as at least one set each of which defining allowable Floating-Point numbers;
   (b) parsing the floating point commands; and
   (c) processing at least the parsed commands for realizing at least on the basis of said events and said at least one coverage model the Floating-Point related application.

33. A computer program product comprising a computer useable medium having computer readable program code embodied therein for causing the computer to implement a Floating-Point related application, comprising:
   computer readable program code for causing the computer to receive a list of floating point commands in a formal computer language; the language having set based constraints that facilitate defining Floating-Point events of interest and regrouping of events into at least one coverage model, in respect to at least one floating-point instruction; the coverage model having the form of a sequence of Floating-Point commands with constraints on (i) at least one intermediate result operand of the floating-point instruction, and (ii) result operand of the floating-point instruction; each one of said constraints is expressed as at least one set each of which defining allowable Floating-Point numbers;
   computer readable program code for causing the computer to parse the floating point commands; and
   computer readable program code for causing the computer to process at least the parsed commands for realizing at least on the basis of said events and said at least one coverage model the Floating-Point related application.

34. A program storage device readable by machine, tangibly embodying a program of instructions executable by the machine to perform method steps for implementing a Floating-Point related application, that includes the steps of:
   (a) receiving a list of floating point commands in a formal computer language; the language having set based constraints that facilitate defining Floating-Point events of interest and regrouping of events into at least one coverage model, in respect to at least one floating-point instruction; the coverage model having the form of a sequence of Floating-Point commands with constraints on (i) at least one intermediate result operand of the floating-point instruction, and (ii) result operand of the floating-point instruction; each one of said constraints is expressed as at least one set each of which defining allowable Floating-Point numbers;
   (b) parsing the floating point commands; and
   (c) processing at least the parsed commands for realizing at least on the basis of said events and said at least one coverage model the Floating-Point related application.

35. A computer program product comprising a computer useable medium having computer readable program code embodied therein for causing the computer to implement a Floating-Point related application, comprising:
   computer readable program code for causing the computer to receive a list of floating point commands in a formal computer language; the language having set based constraints that facilitate defining Floating-Point events of interest and regrouping of events into at least one coverage model, in respect to at least one floating-point instruction; the coverage model having the form of a sequence of Floating-Point commands with constraints on (i) at least one intermediate result operand of the floating-point instruction, and (ii) result operand of the floating-point instruction; each one of said constraints is expressed as at least one set each of which defining allowable Floating-Point numbers;
   computer readable program code for causing the computer to parse the floating point commands; and
   computer readable program code for causing the computer to process at least the parsed commands for realizing at least on the basis of said events and said at least one coverage model the Floating-Point related application.

* * * * *